United States Patent Office 2,906,673
Patented Sept. 29, 1959

2,906,673

METABOLIC PROCESSES

Antony Borrow, Edward Garstang Jefferys, and Ian Stewart Nixon, Welwyn, England, assignors to Imperial Chemical Industries Limited, London, England, a corporation of Great Britain No Drawing. Application February 3, 1958
Serial No. 712,671

Claims priority, application Great Britain
February 6, 1957

11 Claims. (Cl. 195—125)

This invention relates to improved metabolic processes, in particular to metabolic processes used for the production of gibberellic acid.

Gibberellic acid is a plant growth stimulant obtainable from the culture filtrates of certain active strains of the mould *Gibberella fujikuroi* (Fusarium moniliforme). It is known to manufacture gibberellic acid by cultivating an active strain of *Gibberella fujikuroi* in a suitable stirred and aerated nutrient medium containing a source of carbon for example glucose, a source of nitrogen for example ammonium nitrate, certain metallic salts for example magnesium sulphate and potassium dihydrogen phosphate and traces of metals such as iron, copper, zinc, manganese and molybdenum. It is characteristic of this metabolic process that the acid is produced for the most part when net protein synthesis or active growth of the mould has been checked. This check in active growth may be the result of exhaustion of one of the essential constituents of the nutrient medium for example carbon or nitrogen, and preferably carbon.

We have now found, and herein lies our invention, that the rate of production of gibberellic acid is improved if, during the gibberellic acid-producing stage of the metabolic process, the temperature of the medium is maintained within the range 27.5–30.5° C.

Preferably, the temperature of the medium is maintained within the range 28.5–29.5° C. The following example illustrates the improved rate of gibberellic acid production obtained in a mould cultivated at a temperature within the range 27.5–30.5° C. as compared with rates obtained at temperatures outside the range.

Four stirred fermenters, each containing 30 litres of a medium containing:

| | |
|---|---|
| Glucose | 16% w./v. |
| Ammonium nitrate | 0.24% w./v. |
| Potassium dihydrogen phosphate | 0.5% w./v. |
| Magnesium sulphate heptahydrate | 0.1% w./v. |
| Minor element concentrate [1] | 0.2% v./v. |

[1] The composition of the minor element concentrate is as follows:

| | | |
|---|---|---|
| Ferrous sulphate heptahydrate | gm | 0.1 |
| Copper sulphate pentahydrate | gm | 0.015 |
| Zinc sulphate heptahydrate | gm | 0.1 |
| Manganese sulphate heptahydrate | gm | 0.01 |
| Potassium molybdate ($K_2MoO_4$) | gm | 0.01 |
| Water | ml | 100 | were inoculated with an active strain of *Gibberella fujikuroi* (samples deposited in the culture collections of the Commonwealth Mycological Institute, Kew, the Central Bureau voor Schimmelcultures, Baarn, and the Northern Utilisation Research and Development Division of the United States Department of Agriculture, Peoria, Illinois, U.S.A.). Air was passed into each fermenter at a rate of 15 litres/minute and the temperatures of the media were maintained at 24.95° C., 26.8° C., 28.9° C. and 30.8° C. respectively. The gibberellic acid contents (expressed as mg./litre) of each fermenter at various times in the course of the fermentations were as follows:

TEMPERATURE OF FERMENTER

| Time, (hours after inoculation) | 24.95° C. | 26.8° C. | 28.9° C. | 30.8° C. |
|---|---|---|---|---|
| 162 | Nil | Nil | Nil | Nil |
| 186 | Nil | 12 | 37 | 24 |
| 210 | Nil | 25 | 64 | 66 |
| 234 | 14 | 44 | 99 | 97 |
| 287 | 56 | 100 | 195 | 164 |
| 306 | | 131 | 251 | 195 |
| 354 | | 199 | 336 | 236 |
| 378 | | 191 | 328 | 293 |

The invention is particularly applicable to a multi-stage process of producing gibberellic acid as described in our co-pending application No. 712,337 in which at least one separate stage is devoted substantially to gibberellic acid production from mycelium growth in a preceding separate "active growth" stage. The invention is also particularly applicable to the process as described in our co-pending application No. 712,338 relating to a metabolic process for the production of gibberellic acid wherein carbon availability is maintained during the gibberellic production stage by adding a source of carbon to the medium. In such cases or combination of cases, the temperature of the medium in the gibberellic acid producing stage is maintained within the range 27.5–30.5° C., preferably within the range 28.5–29.5° C.

The medium used for the active growth stage of the mould may be a so-called balanced medium wherein the concentration of nitrogen may be within the range of 0.017–0.26% w./v. for example in the form of 0.05–0.75% w./v. of ammonium nitrate and preferably within the range of 0.07–0.17% w./v. of nitrogen for example in the form of 0.2–0.5% w./v. of ammonium nitrate. The concentration of carbon for example in the form of a sugar such as sucrose or glucose or a polyhydric alcohol such as glycerol is then chosen to provide a medium wherein the ratio of carbon to nitrogen preferably lies between the values of 10:1 and 25:1. A typical balanced medium suitable for active growth may contain for example 0.24% w./v. of ammonium nitrate and 3.18% w./v. of glucose monohydrate i.e. a ratio of C:N of 14:1 or it may contain 0.48% w./v. of ammonium nitrate and 10% w./v. of glucose monohydrate, i.e. a ratio of C:N of 21:5.

In the so-called unbalanced medium used in the gibberellic acid production stage, there is preferably a high carbon/nitrogen ratio, i.e. higher than the ratio in which carbon and nitrogen are used up by the mould during active growth, so that active growth is checked by exhaustion of nitrogen and carbon remains available to satisfy the requirement of the mould during gibberellic acid production. A suitable C:N ratio in this unbalanced medium is from 25:1 to 200:1 and preferably from 30:1 to 55:1. Thus the preferred range of concentration of nitrogen in the unbalanced medium is from 0.04–0.17% w./v. for example in the form of 0.11–0.5% w./v. of ammonium nitrate and the corresponding range of concentration of carbon in the said medium is thus from 1.2–9.4% w./v. for example in the form of 3.3–26% w./v. of glucose monohydrate.

The growth of the mould in the acid production stage i.e. in the unbalanced medium continues until the source of nitrogen is completely used up and there then remains an excess of the source of carbon and the production of gibberellic acid begins. During this production of gibberellic acid, the excess of carbon source is steadily used up and when the said source reaches a concentration of about 0.5–10% w./v. of the medium, the addition of further quantities of a carbon source, which may or may not be the same as that used in the earlier stages, begins in order to maintain a constant concentration of carbon in the medium and thereby sustain continued production of gibberellic acid. The preferred source of carbon is a sugar for example sucrose or glucose and the preferred constant concentration of the said sugar during the continued production of gibberellic acid is in the range of about 1% to about 4% w./v. of the medium.

What we claim is:

1. An improved metabolic process for the production of gibberellic acid wherein during the gibberellic acid-producing stage of the metabolic process, the temperature of the medium is maintained within the range 27.5–30.5° C.

2. Process as claimed in claim 1 wherein the temperature of the medium is maintained within the range 28.5–29.5° C.

3. Process as claimed in claim 1 wherein it is applied to a multi-stage process for the production of gibberellic acid in which at least one separate stage is devoted substantially to gibberellic acid production from mycelium growth in a preceding separate "active-growth" stage.

4. Process as claimed in claim 3 wherein the "active-growth" stage is carried out in a balanced medium wherein the concentration of nitrogen is within the range of 0.017–0.26% w./v. for example in the form of 0.05–0.75% w./v. of ammonium nitrate, and preferably within the range of 0.07–0.17% w./v. for example in the form of 0.2–0.5% w./v. of ammonium nitrate.

5. Process as claimed in claim 4 wherein the concentration of carbon is such as to provide a ratio of carbon to nitrogen of between 10:1 and 25:1.

6. Process as claimed in claim 4 wherein the concentrations of nitrogen and carbon are in the form of 0.24% w./v. of ammonium nitrate and 3.18% w./v. of glucose monohydrate or 0.48% w./v. of ammonium nitrate and 10% w./v. of glucose monohydrate.

7. Process as claimed in claim 3 wherein the gibberellic acid production stage is carried out in an unbalanced medium wherein the concentrations of carbon and nitrogen are such that the ratio of C:N is within the range of 25:1 to 200:1 preferably from 30:1 to 55:1.

8. Process as claimed in claim 7 wherein the concentration of nitrogen is within the range of 0.04–0.17% w./v. for example in the form of 0.11–0.5% w./v. of ammonium nitrate and the concentration of carbon is within the range of 1.2–9.4% w./v. for example in the form of 3.3–26% w./v. of glucose monohydrate.

9. Process as claimed in claim 1 wherein it is applied to a process for the production of gibberellic acid in which carbon availability is maintained during the gibberellic acid production stage by adding a source of carbon to the medium.

10. Process as claimed in claim 9 wherein the carbon availability is maintained by a carbon source within the range of about 0.5–10% w./v. of the medium.

11. Process as claimed in claim 10 wherein the carbon source is within the range of about 1–4% w./v. of the medium.

References Cited in the file of this patent

UNITED STATES PATENTS

| | | |
|---|---|---|
| 1,867,946 | Hutchinson | July 19, 1932 |
| 2,394,031 | Waksman et al. | Feb. 5, 1946 |
| 2,842,051 | Brian et al. | July 8, 1958 |

OTHER REFERENCES

Yabuta: Chemical Abstracts, 34, 1940, 3314.
Yabuta: Chemical Abstracts, 44, 1950, 10814.
Gross et al.: Chemistry & Industry, Aug. 28, 1954, p. 1066.
Gross et al.: Jour. Chem. Soc., December 1954, pp. 4670–4676.
Stodola et al.: Arch. of Biochemistry, 54, January 1955, pp. 240–245.